US008181013B2

(12) United States Patent
Zhu

(10) Patent No.: US 8,181,013 B2
(45) Date of Patent: May 15, 2012

(54) METHOD, MEDIA GATEWAY AND SYSTEM FOR TRANSMITTING CONTENT IN CALL ESTABLISHED VIA MEDIA GATEWAY CONTROL PROTOCOL

(75) Inventor: Ning Zhu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1172 days.

(21) Appl. No.: 11/965,831

(22) Filed: Dec. 28, 2007

(65) Prior Publication Data

US 2008/0109652 A1 May 8, 2008

Related U.S. Application Data

(63) Continuation of application No. PCT/CN2006/000620, filed on Apr. 7, 2006.

(30) Foreign Application Priority Data

Jun. 29, 2005 (CN) .......................... 2005 1 0035663

(51) Int. Cl.
*H04L 9/00* (2006.01)

(52) U.S. Cl. ...................................... 713/153

(58) Field of Classification Search ................. 713/153; 173/153
See application file for complete search history.

(56) References Cited

U.S. PATENT DOCUMENTS

| 7,366,894 | B1* | 4/2008 | Kalimuthu et al. ........... 713/153 |
| 7,684,565 | B2* | 3/2010 | Medvinsky ..................... 380/44 |
| 7,844,048 | B2* | 11/2010 | Pessoa et al. .................. 379/386 |
| 2002/0184373 | A1* | 12/2002 | Maes ............................. 709/228 |
| 2003/0167394 | A1* | 9/2003 | Suzuki et al. ................. 713/168 |
| 2004/0158606 | A1 | 8/2004 | Tsai ............................... 709/203 |
| 2004/0158704 | A1* | 8/2004 | Oates et al. ................... 713/151 |
| 2004/0247124 | A1* | 12/2004 | Kamachi ....................... 380/255 |
| 2005/0169244 | A1* | 8/2005 | Luken ........................... 370/352 |
| 2006/0007916 | A1* | 1/2006 | Jones et al. ................... 370/352 |
| 2007/0211302 | A1* | 9/2007 | Wang et al. ................... 358/409 |
| 2009/0208004 | A1* | 8/2009 | Kawai et al. .................. 380/45 |
| 2009/0285204 | A1* | 11/2009 | Gallant et al. ................ 370/352 |

FOREIGN PATENT DOCUMENTS

| CN | 1551557 | 12/2004 |
| EP | 0 891 670 | 6/2000 |
| GB | 2 402 583 | 12/2004 |

(Continued)

OTHER PUBLICATIONS

Menezes et al., "Handbook of Applied Cryptography," 816 pages (1996).

(Continued)

*Primary Examiner* — Kambiz Zand
*Assistant Examiner* — Aubrey Wyszynski
(74) *Attorney, Agent, or Firm* — Slater & Matsil, L.L.P.

(57) ABSTRACT

A method for transmitting content in a call established via media gateway control protocol includes: encrypting an RFC, Request for Comment, 2833 message with a first key; and sending out the encrypted RFC2833 message. The key used for encryption and decryption may be configured in advance on a calling and a called media gateways, or be sent from a soft switch device once and for all, or be sent from the soft switch device every time when a call is initiated. The key sent from the soft switch device may be in clear text or be encrypted. The technical scheme of the present invention greatly improves the security of the content in the RFC2833 protocol transmission.

29 Claims, 2 Drawing Sheets

FOREIGN PATENT DOCUMENTS

| | | |
|---|---|---|
| WO | WO 97/38530 | 10/1997 |
| WO | WO 02/054707 | 7/2002 |

OTHER PUBLICATIONS

Schulzrinnc et al., "RTP Payload for DTMF Digits. Telephony Tones and Telephony Signals," Network Working Group (2000).
International Preliminary Report on Patentability for International Application No. PCT/CN2006/000620, dated Jan. 9, 2008.
International Search Report for International Application No. PCT/CN2006/000620, dated Jul. 20, 2006.
Written Opinion for International Application No. PCT/CN2006/000620, dated Jul. 20, 2006.
Translation of First Chinese Office Action for Application No. 200510035663.8, dated Nov. 21, 2008.
Chinese Office Action for Granted Chinese Patent No. 100525476, dated Aug. 5, 2009.
European Oral Proceeding for Application No. 06722272.9, dated Sep. 29, 2009.
Menezes et al., "Key Management Techniques," Handbook of Applied Cryptography, pp. 546-550 (1997).
Menezes et al., "Techniques for Distributing Confidential Keys," Handbook of Applied Cryptography, pp. 551-553 (1997).
Perkins et al., "RTP Payload for Redundant Audio Data (RFC2198)," (1997). Retreived from the Internet on Oct. 31, 2003: URL:http://www.ieft.org/rfc/rfc2198.txt?number=2198.
Supplementary European Search Report for Application No. 06722272, dated Jun. 30, 2008.

\* cited by examiner

METHOD, MEDIA GATEWAY AND SYSTEM FOR TRANSMITTING CONTENT IN CALL ESTABLISHED VIA MEDIA GATEWAY CONTROL PROTOCOL

CROSS-REFERENCE TO RELATED APPLICATIONS

This is a continuation of International Application No. PCT/CN2006/000620, filed Apr. 7, 2006, which claims the benefit of Chinese Patent Application No. 200510035663.8, filed Jun. 29, 2005, the entire disclosures of which are incorporated herein by reference.

FIELD OF THE INVENTION

The present invention relates to communication technologies in H.248/MGCP (Media Gateway Control Protocol) protocol, and particularly, to methods, media gateways and a system for transmitting RFC (Request for Comment) 2833 protocol messages in an H.248/MGCP call.

BACKGROUND OF THE INVENTION

NGN (Next Generation Network) is a milestone in the history of telecommunication which indicates a new era of telecommunication networks. NGN may be divided into four layers with regard to functions: access and transmission layer, media transfer layer, control layer and network service layer. SoftX (soft switch device) which may provide integrated services and call management is the key component in the control layer of NGN. The SoftX is mainly used for call management, signaling gateway, gateway management, integrated services and enhanced service.

The Media Gateway Control Protocol involved in NGN with SoftX includes, such protocols as H.248, Media Gateway Control Protocol (MEGACO) and MGCP.

The MGCP is raised by IEFT and is a combination of SGCP (Simple Gateway Control Protocol) and IPDC (Internet Protocol Device Control) protocol. The MGCP protocol is a text protocol and messages of the protocol are classified into two categories: commands and responses. Each command requires a response from the party receiving the command and three handshakes for confirmation. In the protocol, the SDP (Session Description Protocol) is used for describing connection parameters to the gateway, and UDP is employed for transmission. Therefore the signaling transmission delay is reduced; and the reliability of data transmission is further ensured by a re-transmission mechanism.

The H.248 and the MEGACO protocols used between the media gateway and the SoftX are the improved and enhanced protocols based on the MGCP protocol. The contents of the H.248 and MEGACO protocols are basically the same. Both the protocols introduce the concept of Termination and Context, and set tip or release calls by using commands including Add, Modify, Subtract, Move, etc. for operations on the Termination and the Context.

In the NGN adopting the above media gateway control protocols, RFC2833 protocol can be employed for transmitting content including DTMF (Dual-Tone Multi-Frequency) and other network signaling and events. RFC2833 protocol describes the method for transmitting DTMF and other network signaling and events in RTP (Real-time Transfer Protocol) packets. According to the RFC2833 protocol, the messages transmitted in a call are in clear text without encryption.

However, RFC2833 has some problems in practical applications. To be particular, commercial corporations including banks and telecommunication companies as well as individuals may need secure and encrypted information transmission. Yet conventional RFC2833 messages are not encrypted in the transmission and are easy to be intercepted and interpreted by others over bearer networks. Therefore, security problems may emerge.

SUMMARY

In view of the above, embodiments of the present invention provide methods, media gateways and a system for transmitting content in a call established via media gateway control protocol, which provide more secure content transmission under RFC2833 protocol.

One embodiment of the present invention provides a method for transmitting content in a call established via media gateway control protocol. The method includes:

encrypting an RFC, Request for Comment, 2833 message with a first key; and sending out the encrypted RFC2833 message.

Another embodiment of the present invention provides a method for transmitting content in a call established via media gateway control protocol. The method includes:

receiving an encrypted RFC, Request for Comment, 2833 message; and decrypting the encrypted RFC2833 message with a first key, wherein the first key is identical with a key used for encrypting the RFC2833 message.

Another embodiment of the present invention provides a media gateway. The media gateway includes:

a processor, configured to encrypt an RFC, Request for Comment, 2833 message with a first key; and a processor, configured to send out the encrypted RFC 2833 message.

Another embodiment of the present invention provides a media gateway. The media gateway includes:

a processor, configured to receive an encrypted RFC, Request for Comment, 2833 message; and a processor, configured to decrypt the RFC2833 message with a first key, wherein the first key is identical to a key used for encrypting the RFC2833 message.

Another embodiment of the present invention provides a method for transmitting content in a call established via media gateway control protocol. The method includes:

encrypting an RFC, Request for Comment, 2833 message with a first key, and sending out the encrypted RFC 2833 message; and decrypting the encrypted RFC2833 message with a second key, wherein the second key is identical to the first key.

Another embodiment of the present invention provides a system for transmitting content in a call established via media gateway control protocol. The system includes:

a first media gateway, configured to encrypt an RFC, Request for Comment, 2833 message with a first key, and send out the encrypted RFC 2833 message; and a second media gateway, configured to decrypt the encrypted RFC 2833 message with a second key, wherein the second key is identical to the first key.

Compared with the conventional method, the technical scheme of the present invention makes a difference in that, when the calling and the called media gateways transmit messages to each other, the transmitting termination encrypts the RFC2833 messages and the receiving termination decrypts the RFC2833 messages. The key used for encryption may be configured in advance on a calling media gateway and the key used for decryption may be configured in advance on a called media gateway, or be sent from a soft switch device once and for all, or be sent from the soft switch device every time when a call is initiated. The key sent from the soft switch device may be in clear text or be encrypted.

The difference in the technical scheme of the present invention brings significant benefits, i.e., the security of the transmitted content is greatly improved by encrypting RFC2833 messages. Therefore the content of the message can hardly be cracked even the messages are intercepted over bearer networks with poor security.

The key can be configured every time when a call is initiated. Therefore different keys can be used for different calls, which make it even harder to crack the encrypted messages.

Furthermore, the key itself can be encrypted in transmission. Therefore the key is also hard to be intercepted and the transmission security is further improved.

DETAILED DESCRIPTION OF THE INVENTION

The present invention is further described in detail hereinafter with reference to the accompanying drawings so as to make the objective, technical solution and merits thereof more apparent.

The present invention is used for encrypting RFC 2833 messages in a media gateway control protocol call. The encryption algorithm used for the messages may be a reversible encryption algorithm so that the original DTMF messages may be obtained at a receiving termination after decryption.

Figure 1:
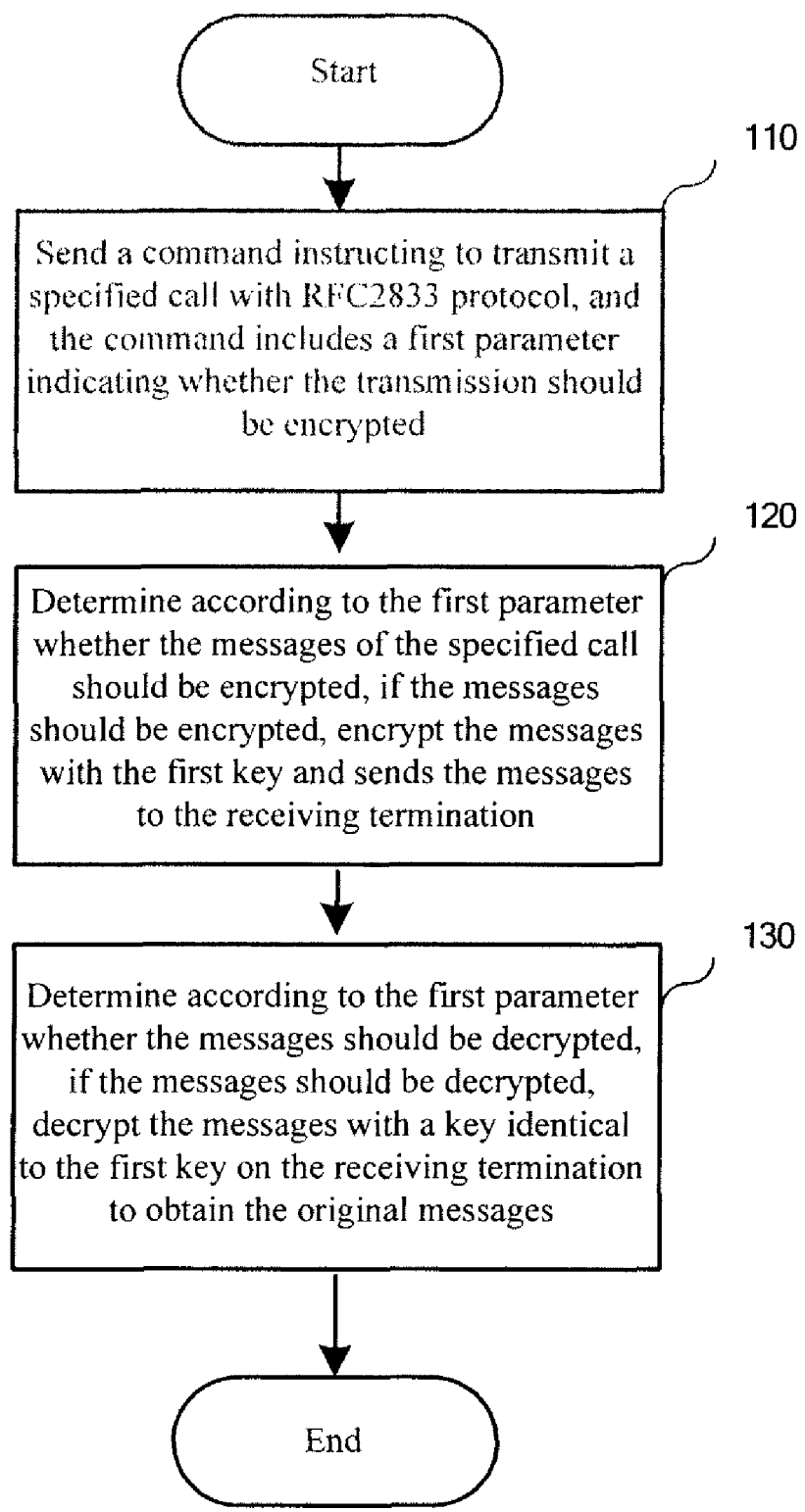
FIG. 1 is a flow chart illustrating the content transmission in a media gateway control protocol call according to a first Embodiment of the present invention.

FIG. 1 shows a method for transmitting content in a media gateway control protocol call according to the first Embodiment of the present invention. In the present invention, the media gateway control protocol can be H.248 protocol, MEGACO protocol or MGCP protocol.

First, in Block 110, a soft switch device sends a command, e.g., ADD or MODIFY command, to a calling and a called media gateways to instruct the calling and the called media gateways to transmit a specified call with RFC2833 protocol. And the command carries a first parameter indicating whether the transmission should be encrypted.

In Block 120, when transmitting messages for the specified call, the calling and the called media gateways judge whether the messages should be encrypted according to the first parameter. If the messages should be encrypted, the messages are encrypted with a local first key and the messages encrypted, i.e. cryptographs are transmitted through RFC2833 protocol from a transmitting termination to a receiving termination. In the embodiment, the RFC2833 messages can be DTMF messages. If the messages need not be encrypted, the procedure of a conventional method is used. The RFC2833 messages are not encrypted.

In Block 130, the calling and the called media gateways, upon receiving messages, judge whether the messages should be decrypted according to the first parameter. If the messages should be decrypted, the messages are decrypted with a first key identical with the key used in the transmitting termination to obtain the original messages.

In the first Embodiment, the first key can be configured in advance on the calling and the called media gateways, i.e., the same key is configured in advance on both the calling and the called media gateways used for transmitting DTMF messages. In the DTMF messages transmission, the calling media gateway encrypts the messages with the key and transmits the encrypted messages through RFC2833 protocol. The called media gateway, upon receipt of the encrypted messages, decrypts the messages to obtain the original DTMF messages.

In the procedure described above, the RFC2833 messages are encrypted. Therefore the security of the transmitted content is greatly improved. The content of the RFC2833 messages can hardly be cracked even the RFC2833 messages are transmitted over bearer networks with poor security. This embodiment is suitable for IP telephone communications in which H.248, MEGACO protocol or MGCP is employed and secure transmission of number information is required, e.g., when a switch device needs an account number and password to receive a number for IVR (Interactive Voice Response).

It should be noted that, according to the present invention, the configuration of the key is not limited to the configuration described above. The description of a second Embodiment to a fifth Embodiment of the present invention illustrates other applications of the present invention. In the following Embodiments, the message encryption and decryption procedures in the message transmission are identical with the encryption and decryption procedures in the first Embodiment, and the only difference lies in the configuration of the key. For the purpose of simplicity, only the difference among the embodiments is explained as follows, and the identical procedures are not explained any further.

The difference between the second Embodiment and the first Embodiment is that, in the second Embodiment, the first key for encrypting messages is not configured in advance in a local machine, but is sent from the soft switch device in an H.248, MEGACO or MGCP message for all transmissions. The key can be sent in clear text.

Many operations may trigger the sending of the first key for all follow-up transmissions, e.g., a network administrator instructs the soft switch device through an OMC (Operations & Maintenance Center) to configure all media gateways, or a soft switch device sends a first key by configuring the media gateways upon launching of the media gateways.

Compared with the first Embodiment, the second Embodiment provides even higher security because the first key is not fixed, but can be configured flexibly on demand and can be modified from time to time.

The first key is transmitted in clear text in this embodiment, however, the signaling links between the soft switch device and the media gateways are more secure (than the links among media gateways), the key transmission is short as the length of the key is short and the key is transmitted at a low frequency (a key can be used for a long time). Therefore it is still hard to intercept the key and the embodiment is still quite practical.

In the second Embodiment, as explained above, only the first key is obtained in a way different from the first Embodiment, and the message encryption and decryption procedures in the message transmission of specified calls are all identical with the encryption and decryption procedures in the first Embodiment and are not described any more.

A third Embodiment of the present invention is an improved version of the second Embodiment. The soft switch device sends the first key in encrypted form the media gateways for all follow-up transmissions.

To be particular, the soft switch device sends the encrypted key to the media gateways in an H.248 message or MGCP message. Upon receipt of the encrypted, key, the media gateways decrypt the key with a local second key to obtain the first key used for RFC2833 protocol message encryption and decryption. It should be noted that the second key can be configured on the calling and the called media gateways in advance, or be sent from the soft switch device in advance, or be generated by using a preset customized algorithm.

Because the first key is transmitted in encrypted form, the possibility of the first key being intercepted is further reduced and the security of the transmission is further improved.

A fourth Embodiment is an improved version of the first Embodiment. In the fourth Embodiment, the first key is sent from the soft switch device to the calling and the called media gateways in an H.248 message, e.g., ADD or MODIFY message, or in a corresponding MEGACO or MGCP message every time before a call is initiated, and the key can be sent in clear text. The calling and the called media gateways encrypt and decrypt the RFC2833 protocol messages of the call with the received first key.

The key can be configured every time when a call is initiated. Therefore different keys can be used for different calls. Compared with the first, the second and the third Embodiments, the fourth Embodiment makes it even harder to crack the encrypted messages.

A fifth Embodiment of the present invention is an improved version of the fourth Embodiment. In the fifth Embodiment, the first key is sent from the soft switch device to the calling and the called media gateways in an encrypted form every time before a call is initiated Encryption of the first key further improves the transmission security.

The methods for transmitting content in a call established via media gateway control protocol in the first Embodiment to the fifth Embodiment of the present invention are explained in preceding description, including the message encryption and decryption procedures and the configuration of the first key. Those skilled in the art can understand that the present invention can be applied to both the calls in which the calling and the called media gateways are covered by a same soft switch device and the calls in which the calling and the called media gateways are covered by different soft switch devices.

Figure 2:
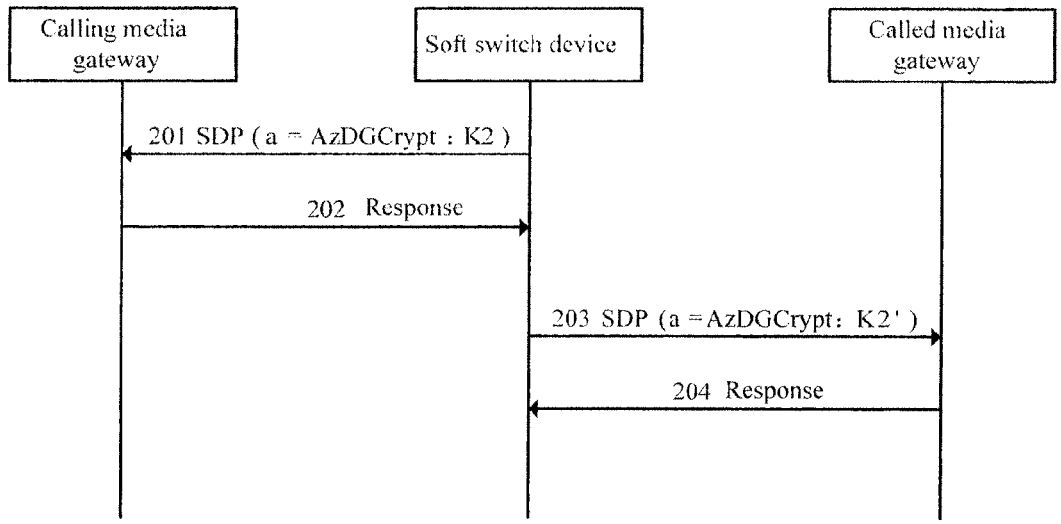
FIG. 2 is a schematic illustrating the signaling transmission of a media gateway control protocol call in accordance with embodiments of the present invention, in which a calling and a called media gateways are covered by the same soft switch device.
Figure 3:
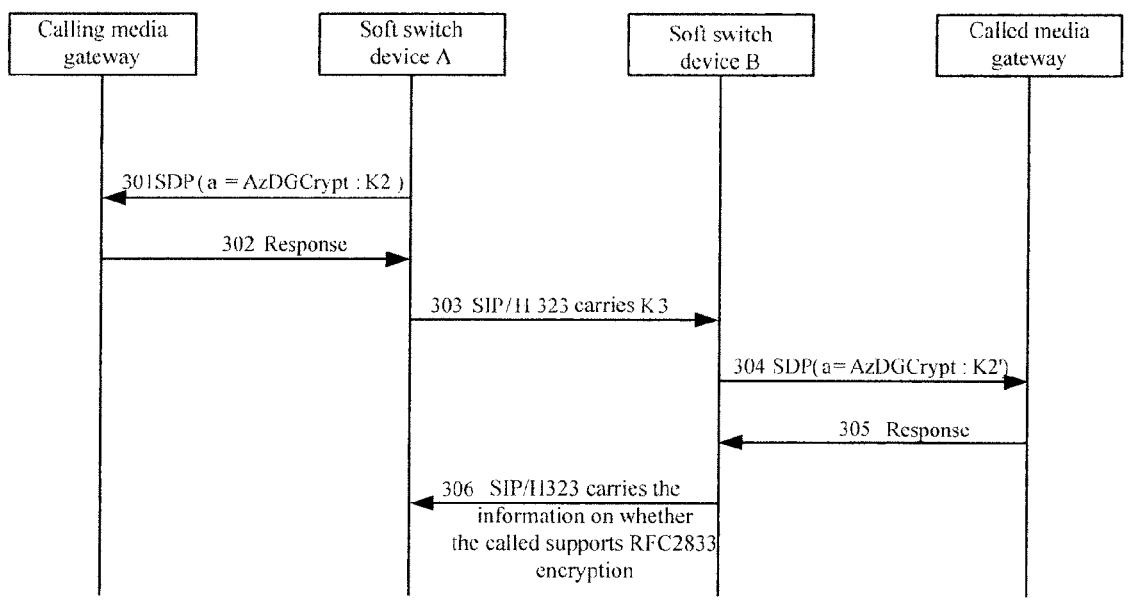
FIG. 3 is a schematic illustrating the signaling transmission of a media gateway control protocol call in accordance with embodiments of the present invention, in which a calling and a called media gateways are covered by different soft switch devices.

With reference to FIG. 2 and the fifth Embodiment, the encryption of the RFC2833 messages is achieved with H.248 protocol. The call procedure in which the calling and the called media gateways are covered by the same soft switch device is explained as follows.

Km stands for the key for encrypting and decrypting the RFC2833 messages (i.e., the key used for encrypting and decrypting the RFC2833 messages in actual Realtime Transport Protocol (RTP) traffics).

K2 stands for shared key of the soft switch device and the media gateway on the calling side.

K1 stands for the encrypted key carried by the SDP on the calling side, and K1 is generated by using the Km and K2 with an encryption algorithm.

K2' stands for shared key of the soft switch device and the media gateway on the called side.

K1' stands for the encrypted key carried by the SDP on the called side, and K1 is generated by using the Km and K2 with an encryption algorithm.

Ks stands for, in cross-soft switch calls, the shared key of the calling and the called gateways on the two soft switch devices.

K3 stands for, in cross-soft switch calls, the encrypted key transmitted between the two soft switch devices, and K3 is generated by using the Km and Ks with an encryption algorithm.

When the calling party and the called party are in the same gateway, the K2=K2' and the K1=K1'.

When the calling party and the called party are not in a cross-soft switch call, the Ks and K3 are not necessary.

The key is updated dynamically before every call and in H.248, MEGACO protocol or MGCP the key is sent to the gateways in an SDP description. The key can be sent in a format such as "a=AzDGCrypt: K", in which the AzDGCrypt is an encryption algorithm field. For example, the AzDGCrypt is a reversible algorithm, which is developed by Azerbaijan Development Group (AzDG). The embodiments in the following description are given with reference to the AzDGCrypt algorithm as an algorithm example. Obviously, other reversible encryption algorithms can also be used in embodiments of the present invention. The K is the encrypted RFC2833 message encryption key, and K is generated by using Km and K2 on the calling side and by using Km and K2' on the called side. The K on the calling side is referred to as K1 and the K on the called side is referred to as K1'. If no corresponding parameter is carried by the SDP, the message is not encrypted.

The key Km, which is actually used for encrypting the RFC2833 messages, is generated by the soft switch device on the calling side and is sent to the calling and the called gateways after being encrypted. And the Km is generated at random by the calling side every time before a call. The following description explains the key transmission procedure in which the calling party and the called party are covered by the same soft switch device.

In Processes 201 and 202, the soft switch device sends the K1 to the calling gateway by inserting "a=AzDGCrypt: K1" into the SDP of an ADD(H.248) or CRCX(MGCP) message, in which the K1 is generated with the following equation: K1=AzDGCrypt (K2, Km).

When the called supports RFC2833 encryption, the soft switch device sends the K1' to the called gateway by inserting "a=AzDGCrypt: K1'" into the SDP of an ADD(H.248) or CRCX(MGCP) message in Processes 203 and 204. The K1' is generated with the following equation: K1'=AzDGCrypt (K2', Km).

When the called does not support RFC2833 encryption, the SDP of the ADD(H.248) or CRCX(MGCP) message to the called does not carry the "a=AzDGCrypt:K1'". The soft switch device judges whether the called supports RFC2833 encryption according to preset configuration. The procedure of the conventional method is adopted when the called does not support RFC2833 encryption, i.e., the RFC2833 messages are not encrypted.

When the called supports RFC2833 encryption, the soft switch device sends the "a=AzDGCrypt: K1" to the calling gateway in the remote property of SDP of the MODIFY (H.248) or MDCX(MGCP) message. The calling gateway calculates the Km by using K1 and K2, and the called gateway calculates the Km by using K1' and K2' in a similar process. The Km is then used for encrypting the RFC2833 messages. When the called does not support RFC2833 encryption, the remote property of SDP of the MODIFY(H.248) or MDCX (MGCP) message to the calling party does not carry "a=AzDGCrypt: K1" and the RFC2833 messages are not encrypted.

The following description explains the RFC2833 encryption procedure between gateways (H.248/MGCP gateways) in a cross-soft switch device call.

In Processes 301 and 302, a soft switch device on a calling side, i.e., soft switch device A sends K1 to a calling gateway by inserting "a=AzDGCrypt:K1" into the SDP of an ADD (H.248) or CRCX(MGCP) message to the calling gateway, in which K1=AzDGCrypt (K2,Km).

In Process 303, soft switch device A sends K3 in an SIP/H323 message to a soft switch device on the opposite side, i.e., to soft switch device B, in which K3=AzDGCrypt (Km, Ks).

When the called supports RFC2833 encryption, soft switch device B on the called side sends K1' to a called gateway by inserting "a=AzDGCrypt:K1'" into the SDP of an ADD (H.248) or CRCX(MGCP) message in Processes 304 and 305, in which K1'=AzDGCrypt (K2',Km).

When the called does not support the RFC2833 encryption, the SDP of the ADD message to the called does not carry the "a=AzDGCrypt: K1'".

In Process 306, soft switch device B informs the soft switch device on the calling side in an SIP/H323 message of whether the called supports RFC2833 encryption, so that the soft switch device on the calling sidle may decide whether the RFC2833 messages should be encrypted.

When the called supports the RFC2833 encryption, the soft switch device on the calling side then sends the K1 to the calling gateway by inserting the "a=AzDGCrypt:K1" in the remote property of the SDP of the MODIFY(H.248) or MDCX(MGCP) message. The calling gateway calculates the Km by using the K1 and K2 and the called gateway calculates the Km by using the K1' and K2' in a similar procedure. The Km is used for encrypting the RFC2833 messages in the RFC2833 message transmission. When the called does not support the RFC2833 encryption, the remote property of the SDP of the MODIFY(H.248) or MDCX(MGCP) message to the calling party does not carry "a=AzDGCrypt:K1" and the RFC2833 messages are not encrypted.

The fore-going description explains the embodiments of the present invention, and the method of the present invention can be further modified in practical applications to meet the requirements of the specific cases. It can be thereby understood that the embodiments of the present invention are used for the purpose of exemplifying, and are not for use in limiting the protection scope of this invention.

The invention claimed is:

1. A method for transmitting content in a call established via media gateway control protocol, comprising:
receiving a command sent from a soft switch device to instruct transmitting content via RFC (Request for Comment) 2833 protocol, wherein the command carries a parameter indicating whether an RFC2833 message should be encrypted;
judging whether the RFC2833 message should be encrypted according to the parameter, and if the RFC2833 message should be encrypted, encrypting the RFC 2833 message with a first key and sending out the encrypted RFC2833 message; and
if the RFC2833 message should not be encrypted, sending out the RFC2833 message.

2. The method of claim 1, wherein
the RFC2833 message is a packet whose format is defined by RFC2833 protocol.

3. The method of claim 2,
wherein
the RFC2833 message comprises a DTMF, Dual-Tone Multi-Frequency, message.

4. The method of claim 2, further comprising:
receiving the first key sent from a soft switch device via a media gateway control protocol message.

5. The method of claim 4, wherein receiving the first key sent from the soft switch device via the media gateway control protocol message comprises:
receiving the first key used for a current call sent from the soft switch device via the media gateway control protocol message when the current call is initiated.

6. The method of claim 4, further comprising:
encrypting the first key to obtain a cryptograph; wherein
receiving the first key sent from the soft switch device via the media gateway control protocol message comprises:
receiving the cryptograph sent from the soft switch device via the media gateway control protocol message.

7. The method of claim 6, further comprising:
decrypting the cryptograph with a second key or a pre-set algorithm to obtain the first key.

8. The method of claim 7, further comprising:
receiving the second key sent from the soft switch device.

9. The method of claim 7, wherein decrypting the cryptograph with the second key to obtain the first key comprises:
decrypting K1 with K2 to obtain Km; wherein
K1 is the cryptograph which is sent from a soft switch device on the calling side to a calling media gateway, K2 is the second key shared by the soft switch device on the calling side and the calling media gateway, Km is the first key, and K1=AzDGCrypt (K2, Km); wherein
encrypting the RFC2833 message with the first key comprises:
encrypting the RFC2833 message with Km.

10. A method for transmitting content in a call established via media gateway control protocol comprising:
receiving a command sent from a soft switch device to instruct transmitting content via RFC (Request for Comment) 2833 protocol, wherein the command carries a parameter indicating whether an RFC2833 message is encrypted;
receiving an RFC 2833 message; and
judging whether the RFC message is encrypted according to the parameter, and if the content is encrypted, decrypting the RFC2833 message with a first key, wherein the first key is identical with a key used for encrypting the RFC2833 message.

11. The method of claim 10, wherein
the RFC2833 message is a packet whose format is defined by RFC2833 protocol.

12. The method of claim 11, further comprising:
receiving the first key sent from a soft switch device via a media gateway control protocol message.

13. The method of claim 12, wherein receiving the first key sent from the soft switch device via the media gateway control protocol message comprises:
receiving the first key used for a current call sent from the soft switch device via the media gateway control protocol message when the current call is initiated.

14. The method of claim 12, further comprising:
encrypting the first key to obtain a cryptograph; wherein
receiving the first key sent from the soft switch device via the media gateway
control protocol message comprises:
receiving the cryptograph sent from the soft switch device via the media gateway control protocol message.

15. The method of claim 14, further comprising:
decrypting the cryptograph with a second key or a pre-set algorithm to obtain the first key.

16. The method of claim 15, further comprising:
receiving the second key sent from the soft switch device.

17. The method of claim 15, wherein decrypting the cryptograph with the second key comprises:
decrypting K1' with K2' to obtain Km; wherein
K1' is the cryptograph which is sent from a soft switch device on the called side to a called media gateway, K2 is the second key shared by the soft switch device on the called side and the called media gateway, Km is the first key, and K1'=AzDGCrypt (K2', Km); wherein
decrypting the encrypted message with the first key comprises:
decrypting the encrypted RFC2833 message with Km.

18. A media gateway, comprising:
a processor, configured to receive a command sent from a soft switch device to instruct transmitting content via RFC (Request for Comment) 2833 protocol, wherein the command carries a parameter indicating whether an RFC 2833 message should be encrypted;
a processor, configured to judge whether the RFC2833 message should be encrypted according to the parameter;
a processor, configured to encrypt the RFC, 2833 message with a first key, if the RFC2833 message should be encrypted; and
a processor, configured to send out the RFC 2833 message.

19. The media gateway of claim 18, wherein
the RFC2833 message is a packet whose format is defined by RFC2833 protocol.

20. The media gateway of claim 19, further comprising:
a processor, configured to preset the first key.

21. The media gateway of claim 19, further comprising:
a processor, configured to receive the first key sent from a soft switch device.

22. The media gateway of claim 19, further comprising:
a processor, configured to figure out Km with K1 and K2; wherein
K1 is a cryptograph which is sent from a soft switch device on the calling side to a calling media gateway, K2 is a shared key of the soft switch device on the calling side and the calling media gateway, Km is the first key, and K1=AzDGCrypt (K2, Km).

23. A media gateway, comprising:
a processor, configured to receive a command sent from a soft switch device to instruct transmitting content via RFC (Request for Comment) 2833 protocol, wherein the command carries a parameter indicating whether an RFC2833 message is encrypted;
a processor, configured to receive an RFC 2833 message;
a processor, configured to judge whether the content is encrypted according to the parameter; and
a processor, configured to decrypt the RFC2833 message with a first key, wherein the first key is identical to a key used for encrypting the RFC2833 message.

24. The media gateway of claim 23, wherein
the RFC2833 message is a packet whose format is defined by RFC2833 protocol.

25. The media gateway of claim 24, further comprising:
a processor, configured to preset the first key.

26. The media gateway of claim 24, further comprising:
a processor, configured to receive the first key sent from a soft switch device.

27. The media gateway of claim 24, further comprising:
a processor, configured to figure out Km with K1' and K2'; wherein
K1' is a cryptograph which is sent from a soft switch device on the called side to a called media gateway, K2' is a shared key of the soft switch device on the called side and the called media gateway, Km is the first key, and K1'=AzDGCrypt (K2', Km).

28. A method for transmitting content in a call established via media gateway control protocol, comprising:
receiving, by a first media gateway a command sent from a soft switch device to instruct transmitting content via RFC (Request for Comment) 2833 protocol, wherein the command carries a parameter indicating whether an RFC2833 message should be encrypted;
judging, by the first media gateway, whether the RFC2833 message should be encrypted according to the parameter and if the RFC2833 message should be encrypted, encrypting the RFC 2833 message with a first key, and sending out the encrypted RFC 2833 message;
receiving, by a second media gateway, a command sent from a soft switch device to instruct transmitting content via RFC2833 protocol, wherein the command carries a parameter indicating whether an RFC2833 message is encrypted; and
receiving, by the second media gateway, an RFC2833 message, judging whether the RFC2833 message is encrypted according to the parameter, if the RFC2833 message is encrypted, decrypting the encrypted RFC2833 message with a second key, wherein the second key is identical to the first key.

29. A system for transmitting content in a call established via media gateway control protocol, comprising:
a first media gateway, configured to receive a command sent from a soft switch device to instruct transmitting content via RFC (Request for Comment) 2833 protocol, wherein the command carries a parameter indicating whether an RFC2833 message is encrypted; and judge whether the RFC2833 message should be encrypted according to the parameter and if the RFC2833 message should be encrypted, encrypt the RFC, Request for Comment, 2833 message with a first key, and send out the encrypted RFC 2833 message; and
a second media gateway, configured to decrypt the encrypted RFC 2833 message with a second key, wherein the second key is identical to the first key.

* * * * *